US005946026A

United States Patent [19]

Suzuki

[11] Patent Number: 5,946,026

[45] **Date of Patent: *Aug. 31, 1999**

[54] MULTIBROADCAST RECEIVER

[75] Inventor: Hiromichi Suzuki, Kanagawa-ken, Japan

[73] Assignee: Kabushiki Kaisha Media Marketing Network, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,314

[22] PCT Filed: Sep. 13, 1995

[86] PCT No.: PCT/JP95/01812

§ 371 Date: May 13, 1996

§ 102(e) Date: May 13, 1996

[87] PCT Pub. No.: WO96/08891

PCT Pub. Date: Mar. 21, 1996

[30] Foreign Application Priority Data

Sep. 14, 1994 [JP] Japan .................................... 6-220688

[51] Int. Cl.[6] ...................................................... H04N 7/00

[52] U.S. Cl. ...................................................... 348/1; 455/2

[58] Field of Search ................................. 348/1, 3, 7, 10, 348/12, 13; 455/2, 4.2, 5.1, 6.2, 6.3; H04N 7/00

[56] References Cited

U.S. PATENT DOCUMENTS

| | | | |
|---|---|---|---|
| 4,926,255 | 5/1990 | Von Kohorn | 348/13 |
| 5,057,915 | 10/1991 | Von Kohorn | 455/2 |
| 5,173,589 | 12/1992 | Diehl et al. | 348/1 |
| 5,227,874 | 7/1993 | Von Kohorn | 348/13 |
| 5,382,970 | 1/1995 | Kiefl | 348/1 |
| 5,515,270 | 5/1996 | Weinblatt | 348/1 |
| 5,519,433 | 5/1996 | Lappington et al. | 348/13 |
| 5,537,473 | 7/1996 | Saward | 348/3 |
| 5,630,204 | 5/1997 | Hylton et al. | 348/12 |

FOREIGN PATENT DOCUMENTS

| | | |
|---|---|---|
| 60-186962 | 9/1985 | Japan . |
| 1-115232 | 8/1989 | Japan . |
| 1-269162 | 10/1989 | Japan . |
| 2-110660 | 4/1990 | Japan . |
| 2-148930 | 6/1990 | Japan . |
| 3-162030 | 7/1991 | Japan . |
| 3-236641 | 10/1991 | Japan . |
| 5-46647 | 2/1993 | Japan . |

*Primary Examiner*—Richard Lee
*Attorney, Agent, or Firm*—Finnegan, Henderson, Farabow, Garrett & Dunner, L.L.P.

[57] ABSTRACT

A multibroadcast receiver for pseudo bidirectional communications between a broadcasting station and an audience via ordinary radio wave mass media such as television and radio. The multibroadcast receiver includes a stereo receiving section for receiving broadcast wave, an acquisition section for acquiring program-content data from the broadcast wave, a control section, an insertion section for the insertion of a card, a printing section for printing necessary data on the card, a reading section for reading data on the card, a key-input section, a storage section, and a communication section for receiving and sending to a remote terminal, data from the control section. Data externally input by an audience through the key-input section, in accordance with an invitation from a broadcast program, program-content data, and audience data, are transmitted to the remote terminal via the communication section. Externally input data and program-content data are printed on the card in the insertion section of the multibroadcast receiver.

22 Claims, 4 Drawing Sheets

MULTIBROADCAST RECEIVER

TECHNICAL FIELD

The present invention relates to a multibroadcast receiver with a pseudo bidirectionality, which can ensure a more effective use of multibroadcast.

BACKGROUND ART

General radio wave mass media systems, which use ground broadcast receivers like television sets and radios or PCM broadcast receivers via communications satellites, basically execute unidirectional communication of information to viewers and listeners (hereinafter called "audience side") from broadcasting stations or program sponsors (hereinafter called "broadcasting station side"). Accordingly, orders on TV shopping, responses to quiz programs and questionnaires, applications for goods, privileges and services presented by sponsors, and so forth should be made through post cards purchased by audiences, or via telephones or facsimiles. For example, bidirectional multimedia communication using optical fibers will soon overcome this problem originated from the unidirectional communication, however, various problems are being left before the unidirectional communication is practically used, such as a vast amount of investment needed for improvement on the infrastructure and terminals and practice required to operate the terminals. (In the following description, information from the broadcasting station side to the audience side is called "downward information" and information from the audience side to the broadcasting station side is called "upward information".)

Recently, broadcasting which transmits digital data signals via multiplex broadcast waves for TVs and radios or PCM broadcast waves has been put to practice, and pseudo bidirectional systems have been proposed which accomplish pseudo bidirectionality by transmitting downward information via data signal broadcasting and upward information via a telephone line (for example, "Telecommunicative voting apparatus" in Japanese Patent Application under Laid-open No. Hei 2-110660, "TV-sound oriented data communication system" in Japanese Patent Application under Laid-open No. Hei 3-162030 and "System for measuring audience rating of programs" in Japanese Patent Application under Laid-open No. Hei 1-115232). Since those apparatus and systems are not designed to collect upward information on the aforementioned broadcast programs, however, they can not be used for the purpose as they are unless modified. First, there are a vast number of audiences who may make replies, so that the costs for the terminals and IC cards that are intervened in the system are not appropriate. Secondly, operations to reply to multifarious addresses through general broadcast programs are unnecessarily troublesome.

The present invention has been accomplished in view of the above problems, and it is therefore an objective of the present invention to provide a multibroadcast receiver which is capable of effectively using added information in data signals in broadcast waves to build a pseudo bidirectional radio wave mass media system for a very large audience.

DISCLOSURE OF THE INVENTION

To achieve this object, according to this invention, there is provided a multibroadcast receiver having receiving and reproducing means for receiving a broadcast wave and reproducing a broadcast program and acquisition means for acquiring program-content data carried on an added-information wave in the broadcast wave in synchronism with the broadcast program, further comprising:

an insertion section for insertion of a card on which predetermined audience data is recorded;

reading means and printing means for reading and writing necessary data from and on the card in the insertion section;

external input means for allowing an audience to input arbitrary data;

communication means for transmitting necessary data via a telephone line;

control means for controlling those means mentioned above; and storage means for storing necessary data, whereby externally input data input by the audience through the external input means in response to an invitation in a broadcast program, program-content data from the acquisition means, and audience data on a card, read by the reading means, are transmitted via the communication means, and the externally input data and the program-content data are printed on the card in the insertion section.

This multibroadcast receiver can be used specifically in the following ways according to each of which pseudo bidirectionality for a very large audience can be accomplished.

First, the broadcasting station side should perform the proper subscription and registration procedures for listeners to record audience data (name, address, bank account number, credit card number, etc.) on cards and should send the cards to the audiences. Each listener sets the card in the insertion section of the multibroadcast receiver to listen to radio broadcast programs. The broadcasting station side requests, in a broadcast program, the listeners who want a giveaway, a ticket and various samples to operate a numeral key "1" on the external input means. Alternatively, the broadcasting station side may present questionnaires and request the operation of the numeral key "1" for approval and a numeral key "2" for disapproval, for example. When the listeners reply using the external input means, externally input data from the external input means, program-content data acquired from the broadcast wave and audience data on the cards are transmitted to, for example, the broadcasting station side via the communication means. At the same time, the externally input data and the program-content data are printed on each card in the insertion section. The broadcasting station side specifies giveaways, tickets, etc. based on the externally input data and the program-content data and sends them to the listeners based on the audience data. Alternatively, the broadcasting station side collects the externally input data as the replies to the questionnaires and sends giveaways to the listeners for the replies.

The multibroadcast receiver of this invention may be used in combination with a TV set for ordinary TV broadcasting. That is, commodities and commodity numbers for placing orders are advertised through a commodities sales TV broadcast program and viewers are requested through a radio broadcast program to input the desired commodity numbers using the external input means. The commodity numbers, audience data and program-content data are transmitted via the communication means.

In this way, the audiences can easily reply to a broadcasting station while listening to a broadcast program and can place an order on TV shopping. Upward information sent from the multibroadcast receiver is a data signal of a specific format and can be thus easily collected, so that it is possible to cope with a very large audience. Since externally input data and program-content data are printed on individual cards at the same time as such upward information is transmitted via the communication means, the cards may be used as copies of applications/replies to quizzes or questionnaires or copies (order slips) of purchases through TV shopping. It is therefore possible to easily cope with misdelivery, giving audiences secure feeling.

Audience data previously recorded on a card may not include the aforementioned name of an audience, address, bank account number and credit card number. More specifically, "unregistered" cards which have simply "serial numbers" recorded thereon should be distributed or sold to unspecified audiences beforehand without performing previous subscription and registration procedures. Externally input data, program-content data and the serial number are sent via the communication means to the broadcasting station side and the externally input data and program-content data are printed on that card, when an audience operates the external input means with this "unregistered" card placed in the insertion section. Thereafter, the audience should write the necessary address, name, bank account number, credit card number, etc. on the card and send it to the broadcasting station side. This way eliminates the troublesome subscription and registration procedures beforehand, so that it is easier to get more subscribers and audiences may not miss the chances of applying for giveaways or ordering commodities. In this usage, it is preferable that the post-card format be printed on one side of a card to reduce the tedious procedures needed for mailing the card.

In addition, inexpensive printable paper or resin cards may be used in this invention. This feature is very advantageous in the cases of mailing cards, distributing or selling a huge number of "unregistered" cards and, using the cards as "copies" which may be discarded after a certain period of time (e.g., after arrival of commodities or giveaways).

Most of downward information (audio explanations and images for giveaways or commodities) need not be transmitted on a data signal in a multibroadcast wave, the presentation of giveaways or commodities is made to the audience side by voices or images on a general broadcast wave and basically only program-content data for identifying the contents of the program is merely contained in the data signal in a multibroadcast wave. Therefore, the amount of data signals to be received and processed by the multibroadcast receiver becomes smaller. Consequently, it is apparent that the hardware cost for information terminals can be kept lower as compared with the case where natural images and voices are all received and processed in the form of a digital data signal. What is more, because known broadcast programs are utilized, it can be accomplished to make the pseudo bidirectional system well known with a lower cost, and it is easier to let audiences register and subscribe. Thus, good use of the scale merit can be made easily.

It is more desirable that program-content data should contain the telephone number of the destination and the communication means should be capable of automatically dialing the destination's telephone number acquired by the acquisition means, because an audience need not write down the telephone number and can surely use different destinations' telephone numbers even if the destinations include various broadcasting stations, sponsoring companies, companies which sell commodities through TV shopping and questionnaires, and survey companies. Further, cards may contain the telephone number of a distributor or seller together with audience data and may be distributed and sold as the company's original cards.

BEST MODES FOR CARRYING OUT THE INVENTION

First Embodiment

Figure 1:
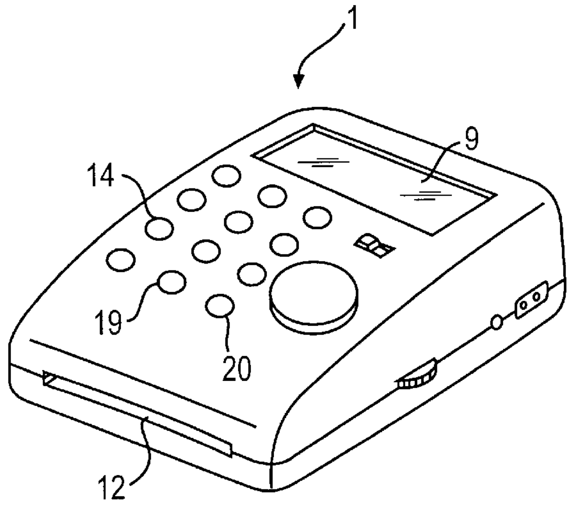
FIG. 1 is a perspective view showing a multibroadcast receiver according to this invention.
Figure 2:
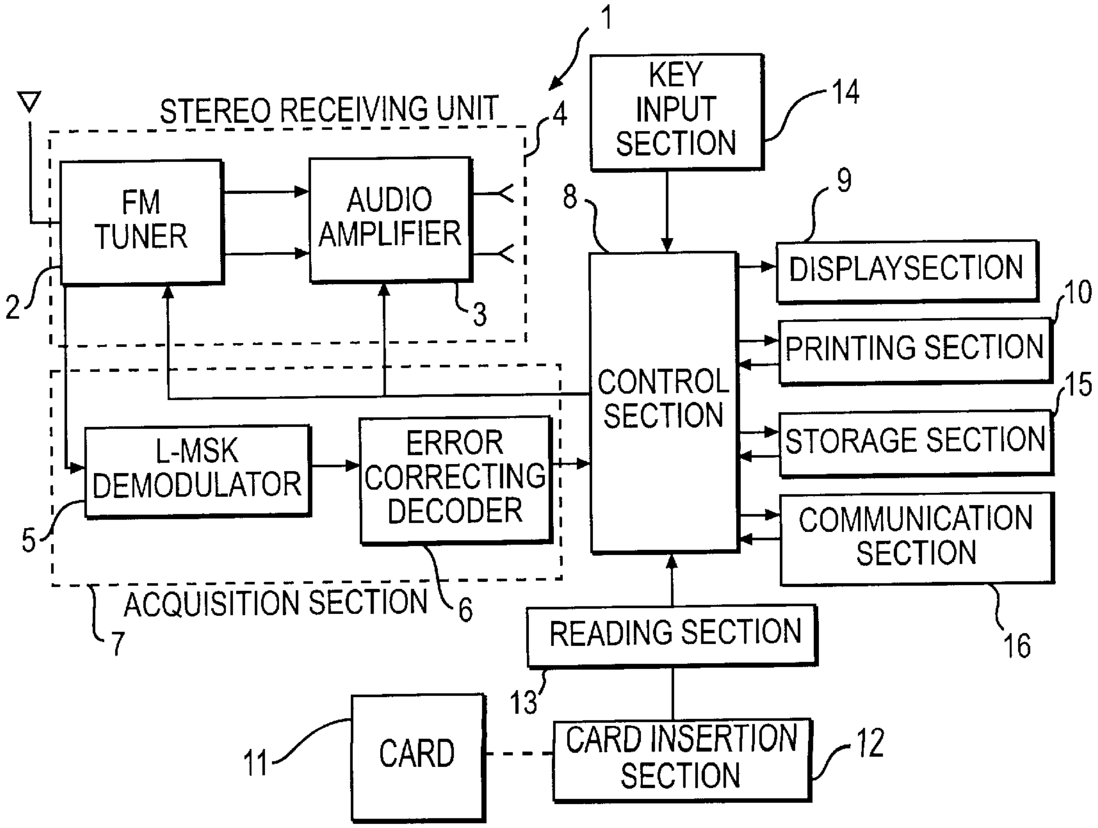
FIG. 2 is a block diagram of the multibroadcast receiver.

A first embodiment of this invention will be now described with reference to the accompanying drawings. As shown in FIGS. 1 and 2, a multibroadcast receiver 1 comprises a stereo receiving section 4 as receiving and reproducing means, an acquisition section 7 as acquisition means, a control section 8 as control means, a display section 9, a printing section 10 as printing means, an insertion section 12 for the insertion of a card 11, a reading section 13 as reading means, a key-input section 14 as external input means, a storage section 15 and a communication section 16.

The stereo receiving section 4 receives a broadcast wave at an FM tuner 2 and sends it through an audio amplifier 3 to be output from a loudspeaker. The acquisition section 7 serves to acquire necessary data (identification, i.e. ID code, character codes, etc. as program-content data associated with the contents of a broadcast program) included in a binary data signal carried on an added-information radio wave in the multibroadcast wave, and comprises an L-MSK (Level controlled Minimum Shift Keying; a digital modulation system which changes the multiplex level in association with the degree of modulation of a stereo difference signal) demodulator 5 and an error-correcting decoder 6. The control section 8 processes the ID code and character codes acquired by the acquisition section 7, various control signals and input signals from other peripheral devices to convert them to predetermined character data and control data, and executes various necessary controls on the peripheral devices. The display section 9, which uses a liquid crystal display device, displays necessary information as needed under the control of the control section 8.

The printing section 10, which is a thermal printer, receives necessary data from the control section 8 and prints necessary information on the card 11 in the insertion section 12. The insertion section 12, where the card 11 to be discussed later shall be inserted, is selectively provided with a sensor to detect whether the card 11 is present or absent. The reading section 13, which is an optically reading device, reads an ID code from the card 11 in the insertion section 12 and sends it to the control section 8. When an audience depresses a desired numeral, the key-input section 14 sends externally input data corresponding to that numeral to the control section 8. The storage section 15 stores necessary data under the control of the control section 8. The communication section 16, which comprises an I/F (Interface) circuit, a demodulator, a transformer and a line connection control unit, receives necessary data from the control section 8 and the storage section 15 then sends necessary data to an external telephone line (not shown).

Figure 3:
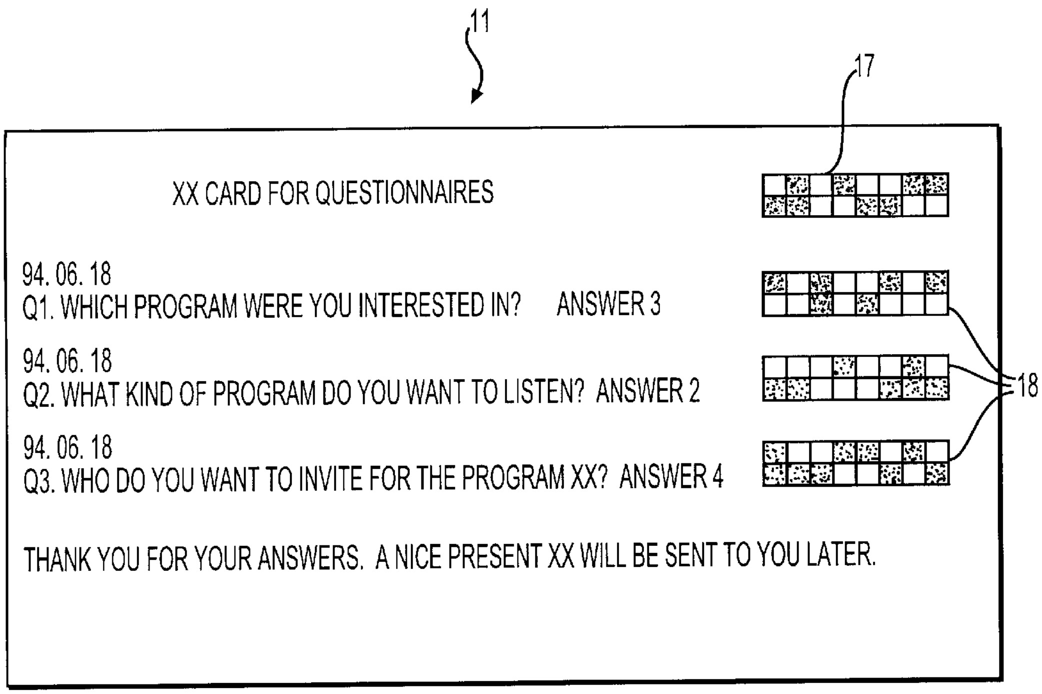
FIG. 3 is a diagram showing a card to be inserted in the multibroadcast receiver.
Figure 4:
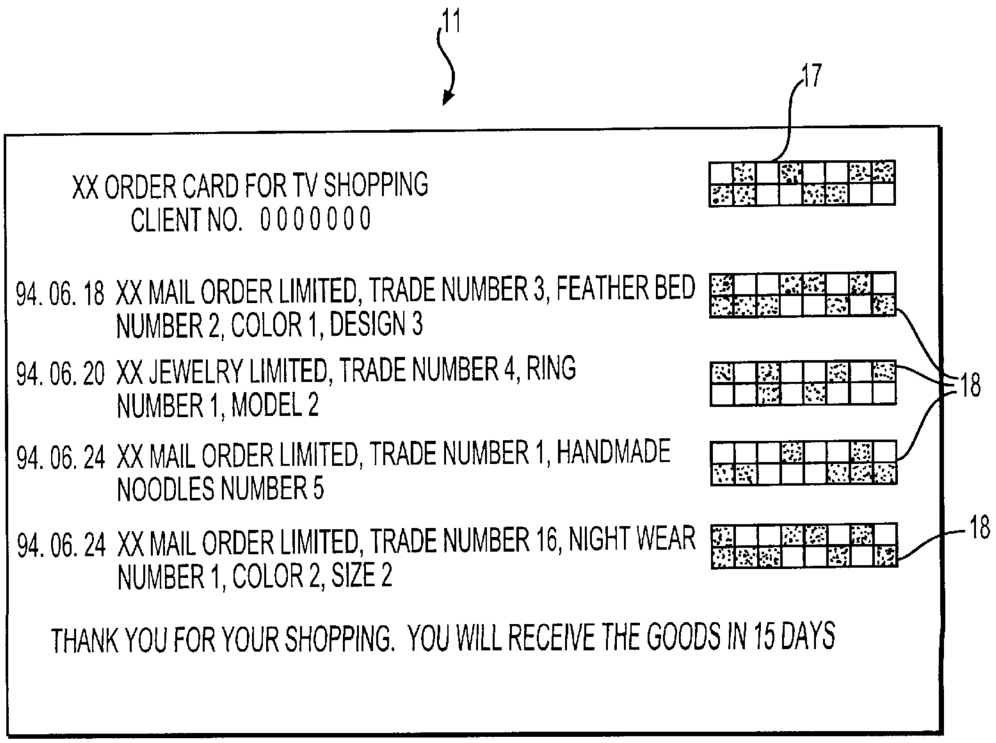
FIG. 4 is a diagram showing another example of the card to be inserted in the multlbroadcast receiver.

As shown in FIGS. 3 and 4, the card 11 is a thin plate printable by the printing section 10. FIGS. 3 and 4 exemplify cards for questionnaires and for TV shopping, respectively. An ID code as audience data (e.g., address, name, bank account number, credit card number and so forth) is previously printed at the top of the card 11 in the form of a 4-digit callular code (plane dividing two-dimensional code) 17 in a hexadecimal notation. The audience data have been previously converted to an associated ID code on the broadcasting station side through predetermined subscription and registration procedures. When the card 11 is inserted in the insertion section 12, the audience data are read by the reading section 13 and stored into the storage section 15 by the control section 8.

Provided at the bottom portion is a recording space to be printed by the printing section 10. That is, the card 11 before usage has only the callular code 17 printed thereon. What is to be printed in this recording space are characters (program name, quiz name, broadcasting date and time, and numerals input through the key-input section 14) as program-content data, acquired as added information from a broadcast wave through the proper conversion, and a callular code 18 indicating them by associated codes (i.e., FIGS. 3 and 4 show the card 11 after usage).

The callular codes 17 and 18 may be printed by magnetic ink or special ink to prevent any unauthorized usage. While the callular codes 17 and 18 are illustrated as 4-digit codes, they may be properly modified to consist of 5 or more digits in accordance with the size of the audible broadcasting area, the number of audiences or the amount of information to be included.

Figure 5:
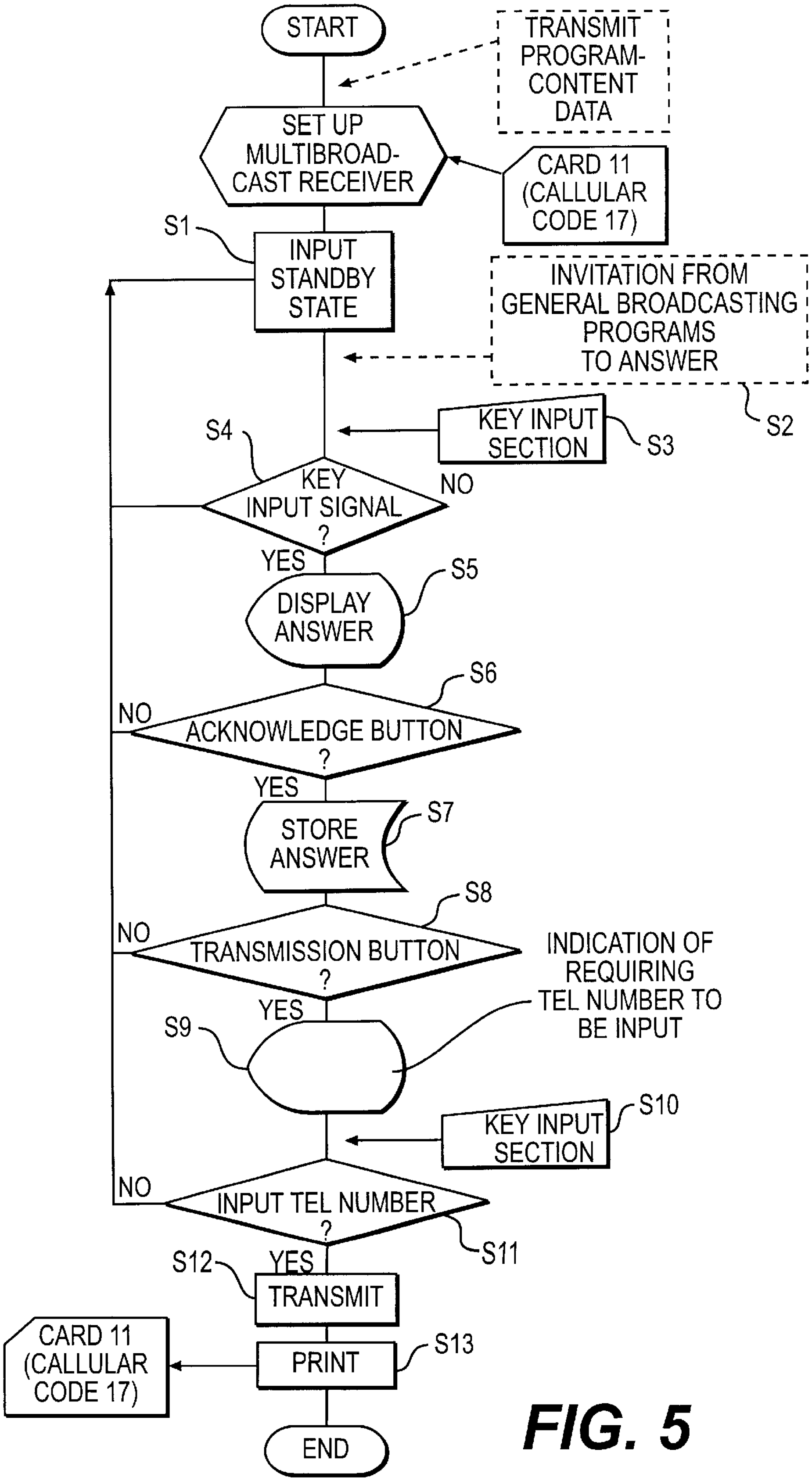
FIG. 5 is a flowchart showing how to use the multibroadcast receiver.

Referring to FIG. 5, a description will be now given of the case where the card 11 in FIG. 4 and the multibroadcast receiver 1 are used to order a desired commodity as a commodities sales program proceeds.

As mentioned above, the callular code 17 having audience data such as the address, name, bank account number and credit card number has been previously printed on the card 11. With the power switch (not shown) switched on, the card 11 is placed into the insertion section 12 (at which time ordinary radio broadcasting or the commodities sales program is received from the stereo receiving section 4). Then, the reading section 13 provided at the position corresponding to the callular code 17 reads the callular code 17 and sends the data to the control section 8. The control section 8 converts them to collateable ID data using a conversion table or the like, properly stores the ID data as audience data in the storage section 15, and proceeds to an input standby state S1.

The transition to this input standby state S1 can be accomplished through various ways. For example, the transition may be made manually by a separately provided switch, or may be automatically made upon power on. Alternatively, a signal indicative of the transition to the input standby state S1 may be included in the general-purpose data area following the header of a data signal in a multibroadcast wave and the control section 8 may perform such control that when the transition indicating signal is acquired following the header, the transition to the input standby state is accomplished.

Then, in the input standby state S1, an audience is requested to enter the desired commodity number in the commodities sales program by numerals using the key-input section 14 (S2). At the same time, the broadcasting station sends program-content data, indicating the broadcasting date and hour, the sponsor and commodity names, on the data signal in the multibroadcast wave. If the audience wants to buy the commodity with the commodity number "3", for example, "3" on the key-input section 14 is to be depressed (S3). The control section 8 checks if a key-input signal has been input (S4), and returns the program-content data and the commodity number "3" on the display section 9 (S5). When a confirmation button 19 on the key-input section 14 is depressed next (S6), the program-content data and commodity number "3" are stored via the control section 8 into the storage section 15 (S7).

To increase the number of items (not only the commodity number, but also the color, pattern, size and the like of the commodity) selectable by audiences, as shown by characters in the recording space in FIG. 4, a flag signal should be sent from the broadcasting station before or after the transmission of the program-content data and a plurality of selectable items should be stored as a group in the storage section 15 based on the flag signal, so that the control section 8 receives collective replies to a group of selectable items from the key-input section 14. For the simplification of explanation, however, the externally input data will be kept assumed as only "3" indicating the commodity number in the following description.

When the audience operates a transmission button 20 (S8) after S1 to S7 are repeated as needed, the control section 8 requests the entry of the telephone number of the destination (e.g., the broadcasting station, the company presenting the giveaways, the company selling the commodities, or the shipping center for the giveaways or commodities) through the display section 9 (S9) to be ready for the input of the telephone number. When the audience operates the key-input section 14 (S10), the control section 8 checks if the telephone number has been input correctly (S11). Then, the control section 8 controls the line connection control unit of the communication section 16 to connect the line, converts the audience data, program-content data (broadcasting date and time, the sponsor, etc.) and the commodity number "3" as externally input data stored in the storage section 15 to analog signals and sends the signals to the destination (S12). Further, the control section 8 prints the program-content data and commodity number "3", stored in the storage section 15, in the form of the characters and numerals and the callular code 18 via the printing section 10 (S13). This callular code 18 is used to be read by the proper optical reader for easier data processing when the card 11 is sent to the broadcasting station or the commodities shipping center by the audience. In S13, therefore, the callular code 18 may be omitted and only characters and numerals may be printed.

Finally, when receiving the audience data, program-content data and commodity number "3" sent in S12, the broadcasting station, the company presenting the giveaways, the company selling the commodities, or the shipping center for the giveaways or commodities, specifies a giveaway or a commodity based on the sent program-content data, delivers it based on the audience data and settles with the payment as needed.

A supplemental description will be now given about a case in which an "unregistered" card 11 on which the address, name, bank account number, credit card number, etc. of the audience have not been previously registered in the callular code 17 on the card 11. In this case, a non-registration code indicating an unregistered audience and a serial number are recorded in the callular code 17. After executing S1 to S11 in the same manner as described above, the audience data (the non-registration code and serial number), the program-content data and the commodity number "3" are transmitted to the broadcasting station, the shipping center for the giveaways or commodities or the like in S12. When the audience data containing the non-registration code and serial number are received, the broadcasting station or the shipping center holds the actual shipment of the commodity or giveaway. The audience should directly write the address, name, bank account number, credit card number, etc. on the card 11 obtained in S13 and should then mail it to the broadcasting station or the shipping center. The broadcasting station or the shipping center refers to the serial number printed on the mailed card 11 and delivers the held commodity or giveaway to the associated audience. At this time, it is desirable that the subscription and registration for this audience should be carried out based on the address, name, bank account number, credit card number, etc. written on the mailed card 11, and a new card 11 having the audience data newly printed as the callular code 17 should be delivered together with the commodity or giveaway.

Figure 6:
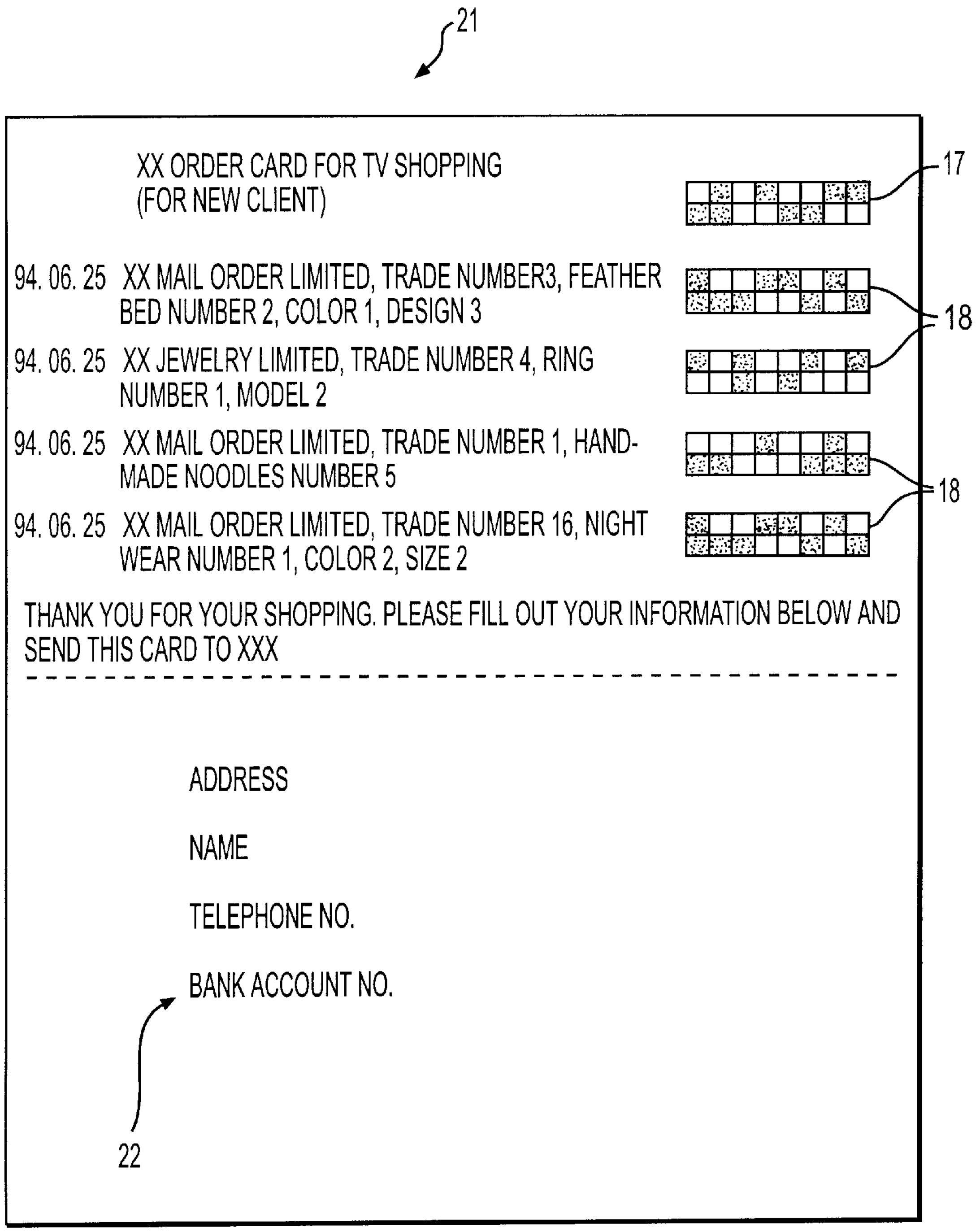
FIG. 6 is a diagram showing a further example of the card to be inserted in the multlbroadcast receiver.

It is more desirable to use a card 21 as shown in FIG. 6 as such an "unregistered" card. The card 21, about the size of a post card, is placed lengthwise about a half length in the multibroadcast receiver 1. If an entry column 22 for entry items (the address, name, bank account number, credit card number, etc.) necessary for the subscription and registration is printed at the bottom of the card 21 and the card 21 has a post-card format with the name and address of the destination (broadcasting station, shipping center or the like) previously printed at the back (the side not shown), the procedures for subscription and registration of audiences become simpler, which is advantageous in getting users.

Second Embodiment

According to a second embodiment, the telephone number of the destination, namely the telephone number of the broadcasting station or shipping center is included by a broadcasting station in program-content data to be carried on the added-information radio wave in a multibroadcast wave and transmitted from the station. In S7 in the first embodiment, this telephone number of the destination is stored together with the program-content data and commodity number "3" in the storage section 15. The telephone number of the destination is read from the storage section 15 and the operation in S12 is executed without going through S9, S10 or S11. As the other part is the same as that in the first embodiment, its description will be omitted.

Third Embodiment

In a third embodiment, the telephone number of a specific destination is previously included in the callular code 17 on the card 11. That is, the telephone number of the broadcasting station or the commodities selling company, which the audience desires, is previously included in the audience data and after the card 11 is placed in the insertion section 12 in the same manner as done in the first embodiment, the telephone number of the destination is stored in the storage section 15. The telephone number of the destination is read from the storage section 15 and the operation in S12 is executed without going through S9, S10 or S11, as per the second embodiment. Because the other part is the same as that of the first embodiment, its description will be omitted.

Since the discrimination of the telephone number of the destination and the program-content data and the discrimination of the telephone number and the other audience data should be accomplished by the proper software in the second and third embodiments, their detailed descriptions will not be given here.

It is more desirable that the line connection control unit of the communication section 16 in each of the above-described embodiments be given with a function equivalent to that of a secondary unit of a radio telephone so that the multibroadcast receiver is radio-connected to the line, thereby improving the handling ability of the multibroadcast receiver 1. Further, it is possible, as needed, to include encoded broadcast programs in the callular code 17, and control the function (auto tuning, volume up, etc.) of the stereo receiving section 4 in accordance with a desired broadcast program before entering the input standby mode in S1.

INDUSTRIAL APPLICATION OF THE INVENTION

As described above, the use of the multibroadcast receiver embodying this invention can accomplish pseudo bidirectional communications which allows audiences to easily make replies, even in broadcasting via ordinary radio wave mass media such as television and radio. As inexpensive cards are intervened, a vast amount of multifarious cards can be distributed and sold. Because the cards also serve as "copies", an application for a giveaway or an order for a commodity can be made before the subscription and registration, so that it is possible to build a pseudo bidirectional radio wave mass media system for a very large audience.

What is claimed is:

1. A multibroadcast receiver having receiving and reproducing means for receiving a broadcast wave and reproducing a broadcast program and acquisition means for acquiring program-content data carried on an added-information wave in said broadcast wave in synchronism with said broadcast program, further comprising:

an insertion section for insertion of a card on which predetermined audience data is recorded;

reading means for reading the recorded audience data from said card in said insertion section;

printing means for writing necessary data on said card in said insertion section;

external input means for allowing an audience to input arbitrary data;

communication means for transmitting necessary data via a telephone line;

control means for controlling the reading means, printing means, external input means, and communication means; and storage means for storing necessary data, whereby externally input data input by said audience through said external input means in response to an invitation in a broadcast program, program-content data from said acquisition means, and the audience data on said card, read by said reading means, are transmitted via said communication means, and said externally input data and said program-content data are printed on said card in said insertion section.

2. The multibroadcast receiver according to claim 1, wherein a post-card format with space for entering an address and characters is printed on one side of said card to facilitate mailing.

3. The multibroadcast reciver according to claim 1, wherein a destination's telephone number is included in said program-content data and said communication means automatically dials said destination's telephone number acquired by said acquisition means.

4. The multibroadcast receiver according to claim 2, wherein a destination's telephone number is included in said program-content data and said communication means automatically dials said destination's telephone number acquired by said acquisition means.

5. The multibroadcast receiver according to claim 1, wherein a destination's telephone number is previously included in said audience data recorded on said card and said communication means automatically dials said destination's telephone number read by said reading means.

6. The multibroadcast receiver according to claim 2, wherein a destination's telephone number is previously included in said audience data recorded on said card and said communication means automatically dials said destination's telephone number read by said reading means.

7. The multibroadcast receiver according to claim 1, wherein said communication means transmits necessary data over a radio connection to a telephone line.

8. The multibroadcast receiver according to claim 2, wherein said communication means transmits necessary data over a radio connection to a telephone line.

9. The multibroadcast receiver according to claim 3, wherein said communication means transmits necessary data over a radio connection to a telephone line.

10. The multibroadcast receiver according to claim 4, wherein said communication means transmits necessary data over a radio connection to a telephone line.

11. The multibroadcast receiver according to claim 5, wherein said communication means transmits necessary data over a radio connection to a telephone line.

12. The multibroadcast receiver according to claim 6, wherein said communication means transmits necessary data over a radio connection to a telephone line.

13. A method for operating a multibroadcast receiver, said method including receiving a broadcast wave from a broadcast station, reproducing a broadcast program from said broadcast wave, and acquiring program-content data carried on an added-information wave in said broadcast wave in synchronism with said broadcast program, said method further comprising:

inserting, into an insertion section of the multibroadcast receiver, a card on which predetermined data is recorded;

reading the recorded data from said card in said insertion section;

setting-up the multibroadcast receiver based on the recorded data read from said card;

prompting a user to input response data in accordance with the broadcast program and storing, in a storage section of the multibroadcast receiver, the response data provided as input from the user; and transmitting, from the multibroadcast receiver to the broadcast station, the response data provided as input from the user and the program-content data acquired from the added-information wave.

14. A method according to claim 13, wherein said predetermined data recorded on said card comprises an ID code representing audience data, said setting-up of the multibroadcast comprising decoding said ID code to determine the audience data and storing the audience data in the storage section of the multibroadcast receiver.

15. A method according to claim 13, wherein said predetermined data recorded on said card includes encoded control data that controls at least one function of a stereo receiving section of the multibroadcast receiver, said setting-up of the multibroadcast comprising decoding said encoded control data and setting, after decoding said encoded control data, at least one function of the stereo receiving section of the multibroadcast receiver.

16. A method according to claim 15, wherein said setting comprises automatically tuning the stereo receiving section of the multibroadcast receiver.

17. A method according to claim 15, wherein said setting comprises controlling the volume of the stereo receiving section of the multibroadcast receiver.

18. A method according to claim 13, said method further comprising printing, on said card in said insertion section, the response data provided as input from the user and the program-content data acquired from the added-information wave.

19. A multibroadcast receiver receiving a broadcast wave from a broadcast station and reproducing a broadcast program from the broadcast wave, said multibroadcast receiver comprising:

an insertion section for inserting a card on which predetermined data is recorded;

reading means for reading the recorded data from said card in said insertion section;

means for setting-up the multibroadcast receiver based on the recorded data read from said card;

a display section that prompts a user to input response data in accordance with the broadcast program;

a storage section that stores the response data provided as input from the user; and means for transmitting, from the multibroadcast receiver to the broadcast station, the response data provided as input from the user.

20. A multibroadcast receiver according to claim 19, further comprising printing, on said card in said insertion section of the multibroadcast receiver, the response data provided as input from the user.

21. A multibroadcast receiver according to claim 19, wherein said predetermined data recorded on said card comprises an ID code representing audience data, said setting-up means comprising means for decoding said ID code to determine audience data, said audience data being stored in the storage section of the multibroadcast receiver.

22. A multibroadcast receiver according to claim 19, wherein said predetermined data recorded on said card includes encoded control data that controls at least one function of a stereo receiving section of the multibroadcast receiver, said setting-up means comprising means for decoding said encoded control data and means for setting, based on the decoded control data, at least one function of the stereo receiving section of the multibroadcast receiver.

* * * * *